March 3, 1936. W. W. CRILEY Re. 19,876

CLUTCH

Original Filed March 3, 1932 2 Sheets-Sheet 1

INVENTOR.
William W. Criley
BY
Fay, Oberlin & Fay
ATTORNEYS.

March 3, 1936. W. W. CRILEY Re. 19,876

CLUTCH

Original Filed March 3, 1932 2 Sheets-Sheet 2

INVENTOR.
William W. Criley
BY
Fay, Oberlin & Fay
ATTORNEYS.

Reissued Mar. 3, 1936 Re. 19,876

UNITED STATES PATENT OFFICE 19,876

CLUTCH

William W. Criley, Cleveland, Ohio

Original No. 1,968,130, dated July 31, 1934, Serial No. 596,498, March 3, 1932. Application for reissue November 14, 1934, Serial No. 753,071

12 Claims. (Cl. 192—85)

This invention relates to a power operated clutch and particularly to large sizes of heavy construction which are used for operating forging machines, presses, and similar heavy duty machinery. The clutch is of the type wherein the engagement is by means of a piston in the shape of a ring or annulus carried within the confines of the rotating parts and among the purposes of the present invention are arranging the clutch so as to decrease the inertia of the stationary parts which are put into motion by engaging the clutch. Other purposes of the invention are to so arrange the parts that adjustments may readily be made from the outside and so that the clutch is of simple and rugged construction. Other aims of the invention will be apparent as the description proceeds.

Although the description and drawings are particularly illustrative of a pneumatically actuated clutch, it will be understood that the invention is not limited thereto, and that actuating fluids other than air may be employed. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
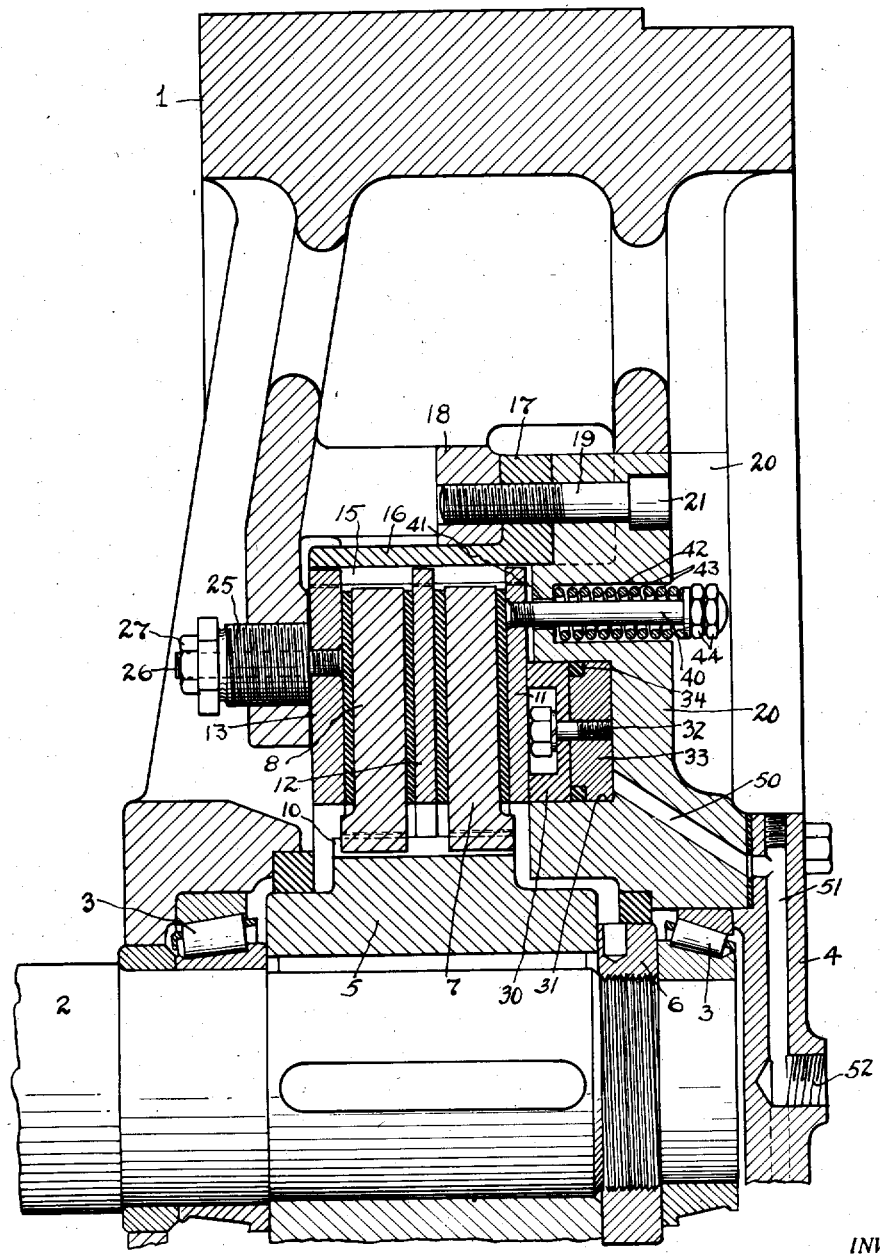
Figure 2:
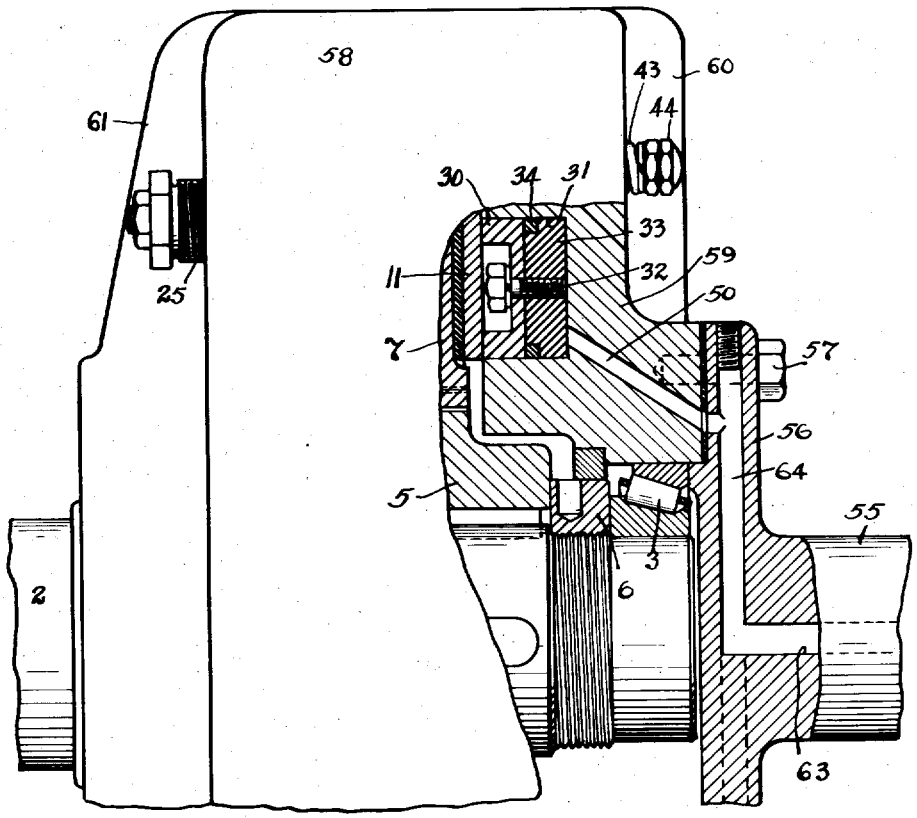

In the drawings Fig. 1 illustrates a central vertical longitudinal section of the upper half of a clutch embodying the principles of my invention and enclosed in the flywheel, it being understood that the lower half is symmetrical therewith, as usual in such mechanisms; and Fig. 2 is a side elevation, partly in vertical central section, of another type of clutch to which my invention is applied.

In the present illustrative embodiment of a preferred form of the invention, as shown in Fig. 1, the improved clutch is illustrated as housed within a flywheel from which power is to be applied to the back shaft or pinion shaft of a forging machine or other heavy mechanism, the connection being through the clutch, and as shown in Fig. 2 the clutch is adapted to connect two stub shafts with no flywheel element.

Referring to Fig. 1, the flywheel 1 is mounted on the back shaft 2 by suitable bearings such as 3, axially spaced and carrying respectively the front and back body portions or walls of the flywheel. In the form here shown, the shaft 2 terminates within the flywheel structure and the front of the flywheel hub is covered by a cap plate 4, suitably secured thereto. A collar 5 keyed to the shaft 2 and longitudinally secured thereon by a round nut 6 threaded to the end of the shaft just inside the outer flywheel bearing carries the driven members 7 and 8 of the clutch assembly. These are annular plates internally toothed to engage with and slide upon the external teeth on the periphery of the collar 5. Complementary annular plates 11, 12 and 13 are interposed with the plates 7 and 8, as shown, 11, 12 and 13 being the driving plates. The clutch plates are faced with suitable friction material. The plates 11, 12, 13 are externally toothed to fit a series of internally directed teeth 15 carried by the flywheel, and are axially slidable on the teeth 15. As a convenient construction, these teeth are formed on the inner surface of a sleeve 16 which is flanged at one side as at 17 and secured against a shoulder portion 18 of the flywheel by a series of filister screws 19 which extend through the flange and through a cover 20, this cover constituting that part of the flywheel front wall which is directly carried by the outer bearing 3. The cover 20 is positioned by the enlarged countersunk heads of the filister screws 19. The flywheel body is of course appropriately recessed to provide a space for the annular plates and their related mechanism.

The clutch plates are adjusted for wear by means of a series of short set screws such as 25 of relatively large diameter threaded through one wall of the flywheel at regular intervals, the inner ends of which bear against the plate 13. The adjustment of these set screws is locked by stud bolts 26 which extend centrally and axially through the set screws 25, being threaded into the plate 13 and carrying lock nuts 27 on their outer ends against the outer face of the set screws.

The plate 11 at the opposite end of the series is pressed inward by an annular piston 30 which forces the various plates into engagement and which consists in detail of a piston proper and a follower 33, with suitable packing 34, and fastened together by a series of bolts 32. The piston fits closely in a corresponding annular recess 31, hereafter referred to as the cylinder, and normally rests on the bottom of the cylinder 31 without clearance when the clutch is released. The clutch is released by a series of bolts 40 the inner ends of which are screwed into the plate 11 at intervals, which bolts protrude out through the front face of the flywheel through axially directed holes 41 which are enlarged as at 42 for the greater part of their depth to receive compression springs 43 the inner ends of which bear on the bottom of the enlarged recesses 42. The outer ends of these springs bear against lock nuts 44 on the outer end of the bolts 40.

The air supply to the cylinder 31 is by means of air ducts 50 which extend diagonally from the cylinder to the face of the hub at circumferential intervals.

The ducts 50 are supplied with air from other ducts 51 in the cap plate 4, which communicate with a source of air supply through a rotatable coupling (not shown) centrally axially threaded at 52 into the plate 4.

Fig. 2 illustrates the clutch as modified for use without a flywheel, for connecting two aligned shafts. In this modification a driving shaft 55 is aligned with a driven shaft 2 and terminates in a flange 56, secured to the clutch casing by suitable means such as cap screws 57. The clutch is housed in a casing 58 which has a front cover plate 59 similar to the cover 20 of Fig. 1. The casing and the cover are reenforced by radial ribs such as 60 and 61 respectively.

Within the casing 58 the identical mechanism shown in Fig. 1 is housed, and therefore this mechanism is not repeated in Fig. 2 except for the piston 30, 33, air duct 50, and parts of the clutch plates 7 and 11. The bolt 40, surrounded by its spring 43, and the set screw 25 both appear in Fig. 2.

An air passage 63 extends axially through the stub shaft 55 to the flange 56 where it divides into a number of radial branches such as 64, each connecting in turn with one of the air passages 50, which supply air to the piston 30. The passage 63 is connected by any suitable means (not shown) to a source of supply.

The method of operation is as follows. Assuming the clutch elements out of engagement, with the flywheel rotating and the shaft 2 at rest, air is admitted to the cylinder 31 and moves the piston 30 forward, thus pushing the plate 11 towards the plate 7 and so, in turn, increasing the side frictional engagement throughout the series of plates, against the fixed plate 13. This movement also compresses the springs 43. Thus the plates 7 and 8 are brought into motion, and, being fixed by the engagement of their internal teeth with the teeth 10 of the collar 5, transmit this motion to the shaft 2. To disengage the clutch, the air in the cylinder is vented. The springs 43 now being free to expand, move the plate 11 out of contact and release the axial pressure on the clutch elements. To disassemble the clutch entirely, the filister screws 19 are withdrawn and the cover 20 removed. If the nuts 44 have not been previously removed, the piston assembly and the plate 11 will come off with the cover 20, so that it will not be necessary to readjust the spring 43 on replacing the cover.

If there is no occasion to avoid readjustment of the springs 43, the nuts 44 can be taken off before the cover is removed and thus the plate 11 will remain in place. In any event, once the cover has been removed the rest of the clutch plates may be readily slid axially along their respective teeth and taken out, the bolts 26 having been previously removed.

It will be seen from the foregoing that when the clutch is engaged the only clutch elements which must be brought into motion from a position of rest are the plates 7 and 8, the collar 5 and the shaft 2. All the remaining elements of the clutch are in constant rotation with the flywheel 1 or the casing 58, as the case may be.

Further advantages of this clutch are that none of the elements extend beyond the confines of the flywheel 1, all adjustments are readily made without disassembling any part, and the clutch may be completely disassembled without dismounting the flywheel or the casing. Axial adjustment of the collar 5 may be made in the form shown in Fig. 1 without removing the cover 20, because taking off the cap 4 permits removal of the forward bearing 3, after which the nut 6 can be reached by appropriate tools. As readily apparent from the drawings, the thrust and the reaction of the piston are both taken within the flywheel structure. Furthermore, the amount of travel necessary to engage or release the clutch is slight, thus assuring quick starting and stopping.

Other modes of applying the principle of my invention may be employed instead of the one explained, change being made as regards the mechanism herein disclosed provided the means stated by any of the following claims or the equivalent of such stated means be employed.

I therefore particularly point out and distinctly claim as my invention:

1. A clutch contained within a rotatable casing and adapted to connect said casing with a shaft projecting thereinto, comprising in combination a sleeve in said casing, means for holding said sleeve and constraining the same to rotate with the casing, a plurality of plates rotating with but axially movable within said sleeve, a cover for one end of said casing, said cover being formed with an annular space directed into said casing consituting an air cylinder, plates on said shaft rotatable with but axially movable thereon and interposed between the plates in said sleeve, and a piston within said cylinder for moving said plates axially into mutual engagement.

2. In combination, a clutch within a driving housing, a driven shaft projecting into said housing, clutch plates axially movable on said shaft, clutch plates axially movable in said housing interposed between said first named clutch plates, a cover constituting one face of said housing, an annular cylinder in said cover, a piston in said cylinder adapted to force said clutch plates axially into lateral engagement, means extending through the side of said housing opposite said cover for limiting the axial travel of said plates, and means extending through said cover and movable with said plates whereby the axial travel of said plates may be gauged.

3. A clutch comprising in combination a driven shaft, a driving element having front and rear walls and having bearings on said shaft at each of said walls, a plurality of clutch plates keyed to such shaft, plates interfitting with said first-named plates and keyed to said driving element, a centrally disposed plate constituting a side of said driving element, an annular cylinder adapted to bear against one of said clutch plates, studs projecting through said cover element but within the thickness of the driving element and movable axially in accordance with plate travel whereby piston travel may be gauged without disassembling the clutch, said studs being secured to one of said plates and provided with springs opposing the closing travel of said piston, and adjusting stops engaging interiorly with the ends of said series of plates remote from the piston and projecting through the rear wall of the driving element whereby the travel of said piston may be adjusted without disassembling the clutch.

4. A clutch comprising, in combination, a shaft, a wheel upon one end of said shaft, body portions of said wheel spaced axially with respect to said shaft, bearings axially spaced on said shaft carrying said respective body portions, clutch plates carried by said wheel and by said shaft between said body portions, an operating mechanism for said clutch plates, said mechanism including an axially reciprocable pressure fluid-actuated piston carried by one of said body portions, said piston being adapted to exert lateral pressure on said clutch plates, and a cap attached to said outer body portion and closing off the shaft end.

5. In a clutch, driving and driven members one of which comprises a rotatable housing member, the other of which comprises a shaft whereon said housing member is mounted, said clutch being disposed centrally in said housing member; in combination, a sleeve within said housing member, means for holding said sleeve in said housing member for rotation therewith, a plurality of driving plates axially movable within said sleeve but rotatable therewith, a cover on one end of said housing member, said cover being formed with an inwardly-directed space constituting a fluid-pressure cylinder, plates axially movable on said shaft but rotatable therewith and interposed with the plates in said sleeve, and a piston within said cylinder for moving said plates axially into mutual engagement.

6. In a clutch adapted to connect a driving casing to a driven shaft whereon the casing is mounted, the combination which comprises a sleeve housed in a central opening in the casing, means for holding said sleeve to rotate with the casing, a plurality of driving plates rotating with but axially movable within said sleeve, a cover for one end of said opening, said cover being formed with an annular space directed toward said opening constituting an air cylinder, plates on said shaft rotatable with but axially movable thereon and interposed between the plates in said sleeve, an annular piston within said cylinder for moving said plates axially into mutual engagement, means supported by said cover plate for moving said plates axially out of engagement, and means on the end of said opening opposite said cover for positioning said clutch plates axially.

7. In a clutch adapted to connect a driving casing to a driven shaft whereon the casing is mounted, the combination which comprises a sleeve housed in a central opening in the casing, said sleeve being outwardly flanged at its front end, internal axial teeth in said sleeve, a cover adapted to close the opening and complete the front face of the casing, said cover overlapping said flange, clutch release mechanism carried by said cover, an annular pressure cylinder formed in said cover and an annular piston carried thereby movable toward said opening, a collar on said shaft within said opening, external axial teeth on said collar, a series of interposed clutch plates carried respectively and alternately by the teeth of said sleeve and by the teeth of said collar, said plates being axially movable along their respective supporting teeth under the influence of said piston in one direction and under the influence of said clutch release mechanism in the other, and means in the back wall of said casing for limiting the travel of said plates.

8. In combination, a clutch within a housing, a shaft projecting into said housing, a sleeve centrally axially fixed within said housing, a plurality of driving plates rotatable with but axially movable within said sleeve, a cover for one end of said sleeve, said cover being formed with a space directed inward constituting an air cylinder, plates on said shaft rotatable with but axially movable thereon and interposed between the plates in said sleeve, a piston within said cylinder for moving said plates axially into mutual engagement, said cover being annular and having a central opening opposite the end of said shaft, a plurality of air passages from the face of said cover near said central opening to said cylinder, a cap for said central opening overlapping the face of said cover, air passages in said cap communicating with the air passages in the cover, all of said air passages being connected with a source of supply at the center of rotation of said assembly.

9. A clutch comprising, in combination, a shaft, a housing having two sides, bearings upon the shaft for each side of the housing, a plurality of mutually interposed plates alternately mounted in said housing and on said shaft, a centrally open annular cover on one face of said housing and constituting one side thereof, said shaft terminating approximately in the plane of the outer surface of said cover, an annular cylinder formed in said cover, an annular piston movable axially therein, air passages through said cover to said cylinder, a closure member over the opening in said cover, a central air port in said closure member, and generally radial air passages from said port to said passages in said cover.

10. A clutch comprising in combination, a shaft, a housing having front and rear ends, bearings on said shaft for both ends of said housing, said shaft terminating short of the outer face of one of said ends, a series of clutch plates carried by said shaft and another series carried by said housing, operating mechanism for said clutch plates carried by said housing, said operating mechanism comprising a piston and an annular cylinder for said piston, the annular cylinder being formed in one end of said housing, said piston being between the planes of said bearings.

11. A clutch comprising, in combination, a shaft, a housing thereon, axially spaced portions of the housing body, axially spaced bearings on said shaft carrying said respective body portions, interengageable clutch plates carried by said housing and by said shaft between said body portions, piston-and-cylinder operating mechanism for said clutch plates, said mechanism being carried by one of said body portions, said piston being adapted to exert lateral pressure on said clutch plates.

12. A clutch comprising, in combination, a shaft, a housing thereon having spaced front and rear body portions and having bearings on said shaft at each of said body portions, clutch plates carried by said housing and by said shaft between said body portions, an operating mechanism for said clutch plates, said mechanism including an axially reciprocable pressure fluid-actuated piston carried by the outer of said body portions, said piston being adapted to exert lateral pressure on said clutch plates.

WILLIAM W. CRILEY.